(12) United States Patent
Ito et al.

(10) Patent No.: US 7,731,407 B2
(45) Date of Patent: Jun. 8, 2010

(54) DISPLAY DEVICE

(75) Inventors: Atsushi Ito, Tokyo (JP); Masayuki Kawano, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 39 days.

(21) Appl. No.: 11/679,294

(22) Filed: Feb. 27, 2007

(65) Prior Publication Data
US 2007/0211494 A1  Sep. 13, 2007

(30) Foreign Application Priority Data
Mar. 2, 2006  (JP) .......................... P2006-056821

(51) Int. Cl.
*F21V 7/04* (2006.01)
(52) U.S. Cl. .................. 362/612; 362/611; 362/618
(58) Field of Classification Search .......... 362/600–634
See application file for complete search history.

(56) References Cited

U.S. PATENT DOCUMENTS

| | | | | |
|---|---|---|---|---|
| 6,036,328 A | * | 3/2000 | Ohtsuki et al. | 362/612 |
| 6,079,838 A | * | 6/2000 | Parker et al. | 362/617 |
| 7,237,941 B2 | * | 7/2007 | Hsieh et al. | 362/633 |
| 2004/0130911 A1 | * | 7/2004 | Chen | 362/558 |

FOREIGN PATENT DOCUMENTS

| JP | 2003-195265 | 7/2003 |
|---|---|---|
| JP | 2004-349020 | 12/2004 |

OTHER PUBLICATIONS

U.S. Appl. No. 11/679,377, filed Feb. 27, 2007, Ito.

* cited by examiner

*Primary Examiner*—Sandra L O'Shea
*Assistant Examiner*—William J Carter
(74) *Attorney, Agent, or Firm*—Oblon, Spivak, McClelland, Maier & Neustadt, L.L.P.

(57) ABSTRACT

A display device includes: a light source; a light guide plate including a first plate surface that emits light incident from the light source, a second plate surface other than the first plate surface, and at least two protruding portions formed on the second plate surface; a light source board including the light source arranged thereon, the light source board arranged on the second plate surface; and an optical sheet including a first sheet surface arranged to face the first plate surface, a second sheet surface arranged to face the light source board, and at least two protruding portions formed on the second sheet surface.

12 Claims, 6 Drawing Sheets

DISPLAY DEVICE

CROSS-REFERENCE TO RELATED APPLICATIONS

This application is based upon and claims the benefit of priority from Japanese Patent Application No. 2006-056821, filed on Mar. 2, 2006, the entire contents of which are incorporated herein by reference.

BACKGROUND OF THE INVENTION

1. Field

The present invention relates to a display device using a light source board.

2. Description of the Related Art

A display device, a display device using liquid crystal for example, is disclosed in FIG. 13 of JP-A-2004-349020. The display device includes: a liquid crystal panel that has a display surface; a light guide plate arranged on a surface opposite to the display surface of the liquid crystal panel to guide light to the liquid crystal panel; and a light source such as a light emitting diode (LED) arranged on a side surface of the light guide plate. By propagating light from a light source in a light guide plate and diffusing the light in a diffusion pattern provided in the light guide plate, the light is extracted onto the display surface.

The display device further includes a middle frame for supporting a light guide plate arranged therein, an optical sheet, and a reflective sheet. The light guide plate has a first surface to face the liquid crystal panel, and a second surface opposite to the first surface. The optical sheet is arranged on the first surface of the light guide plate. The reflective sheet is arranged on the second surface of the light guide plate so as to effectively guide light from the light sources. A light source is arranged on the side surface of the light guide plate. A light source board is formed in the shape of T or L and feeds power from a power supply unit.

In the display device, a middle frame is provided with concave portions that are fitted to protruding portions for position regulation formed on the optical sheet and the light guide plate, thus resulting in a larger frame area of the display device. However, if smaller protruding portions for position regulation are provided on the optical sheet and the light guide plate include so as not to influence the frame area of the display device, this results in dislocation of the optical sheet and the light guide plate due to impact.

When protruding portions for position regulation formed on a light guide plate are arranged on the side surface on the light source side in order to narrow the frame of the display device, it is necessary to provide a T-shaped or L-shaped light source board so as to avoid contact between the protruding portions and the light source board. This involves reduced number of light source boards segmented thus adding to the manufacturing costs.

When a light source board is formed in a linear shape to suppress the increase in the manufacturing costs of a light source board, the light source board is loaded on a light guide plate in close proximity to the power feeding portion, thus increasing the thickness of the entire display device. Further, the optical sheet is deformed by the light source board, which degrades the display quality.

SUMMARY OF THE INVENTION

The invention has been accomplished in view of the above problems. An object of the invention is to provide a display device using a light source capable of reliably regulating the displacement of an optical sheet and a light guide plate without degrading the display quality as well as capable of decreasing the manufacturing costs and reducing the frame size.

According to a first aspect of the invention, there is provided a display device including: a light source; a light guide plate including a first plate surface that emits light incident from the light source, a second plate surface other than the first plate surface, and at least two protruding portions formed on the second plate surface; a light source board including the light source arranged thereon, the light source board arranged on the second plate surface; and an optical sheet including a first sheet surface arranged to face the first plate surface, a second sheet surface arranged to face the light source board, and at least two protruding portions formed on the second sheet surface.

According to a second aspect of the invention, there is provided a display device including: a light source; a light guide plate including a first plate surface that emits light incident from the light source, and a second plate surface other than the first plate surface; a light source board including the light source arranged thereon, the light source board arranged on the second plate surface; an optical sheet including a first sheet surface arranged to face the first plate surface, a second sheet surface arranged to face the light source board, and at least two protruding portions formed on the second sheet surface; and a middle frame including at least two convex portions on an inner side surface thereof to support the light guide plate with side surfaces of the convex portions.

DETAILED DESCRIPTION OF THE PREFERRED EMBODIMENT

Embodiments of the invention will be described below. The description that follows is meant to explain embodiments of the invention and the invention is not limited to the embodiments described below. For simplicity, the description includes omissions or simplification as required. Those skilled in the art will be able to readily change, add or convert each element of the embodiments without departing from the scope and spirit of the invention.

Embodiment 1

Figure 1:
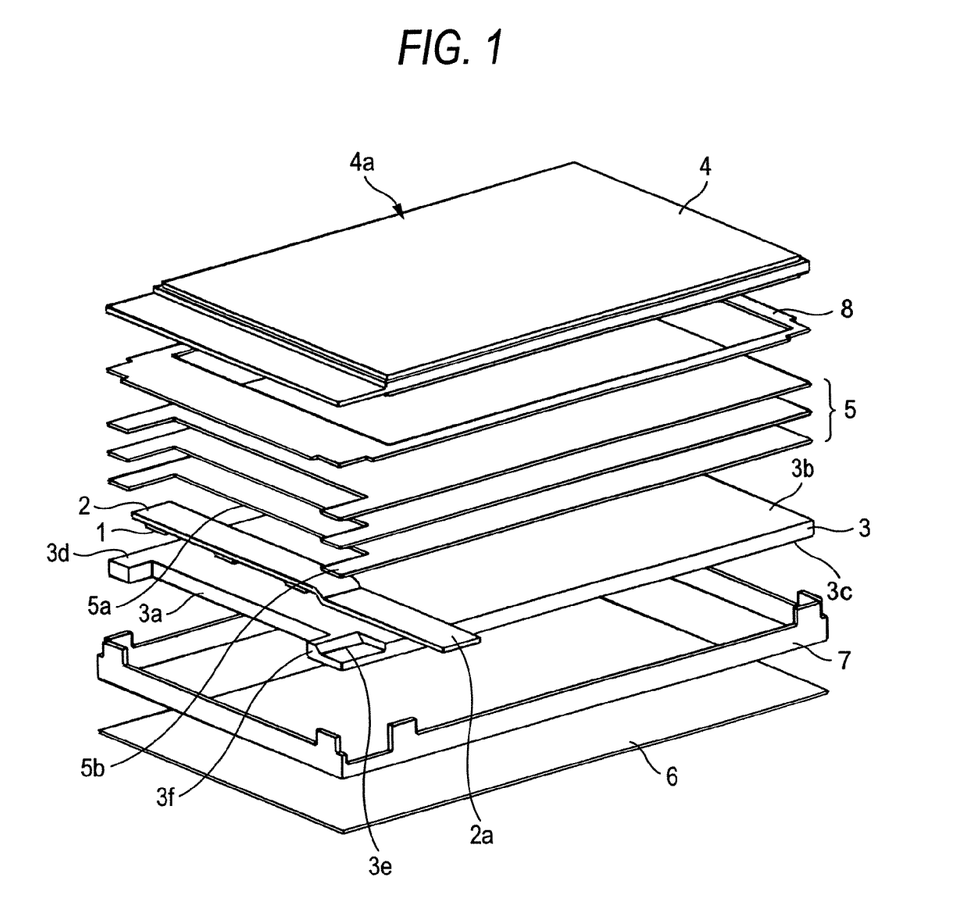
FIG. 1 is an exploded perspective view of a display device in Embodiment 1 of the invention.
Figure 2:
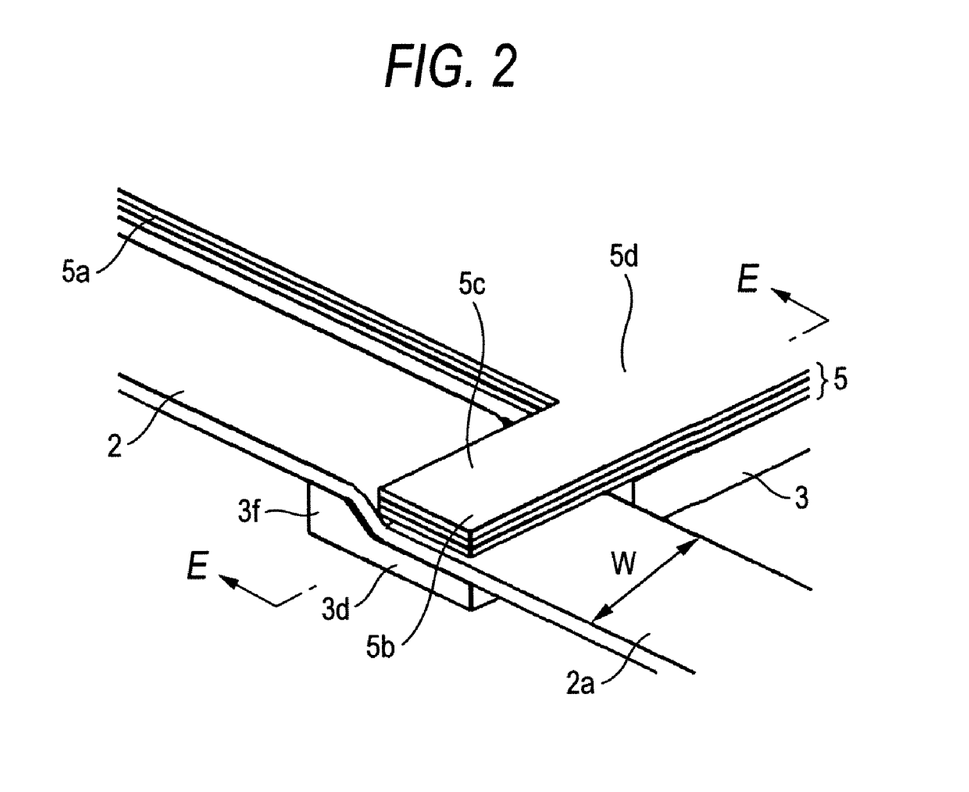
FIG. 2 is an enlarged view of a power feeding portion and its neighborhood of the light source board in Embodiment 1 of the invention.
Figure 3:
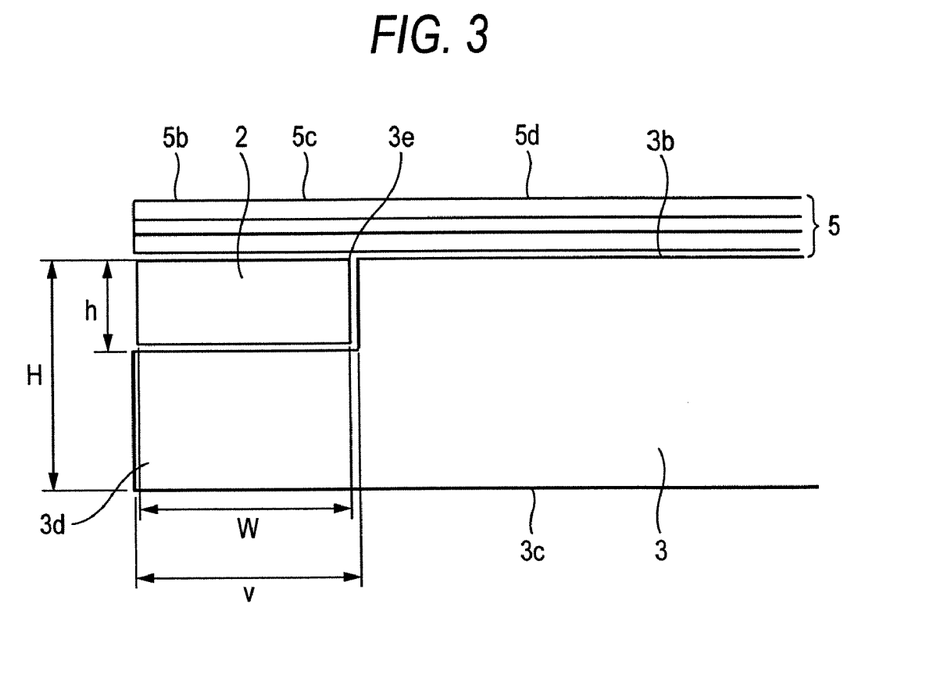
FIG. 3 is a cross-sectional view in the E-E direction of FIG. 2.
Figure 4:
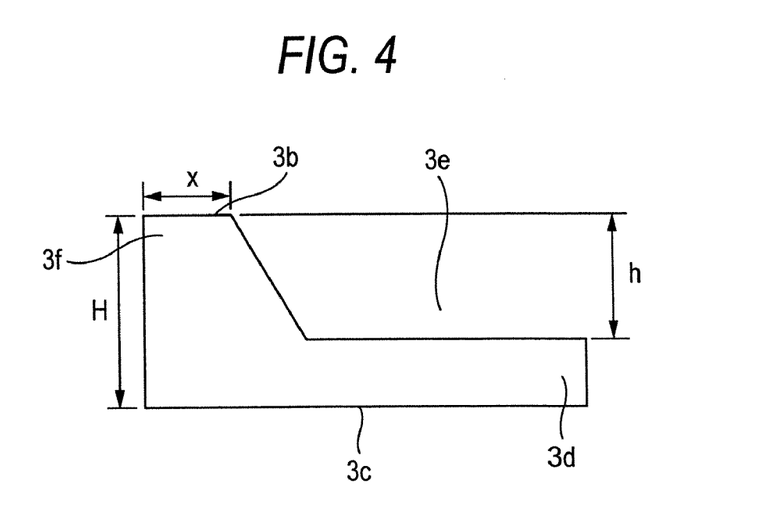
FIG. 4 illustrates the shape of a protruding portion of the light guide plate in Embodiment 1 of the invention.

FIG. 1 is an exploded perspective view of a display device in Embodiment 1 of the invention. FIG. 2 is an enlarged view of a power feeding portion and its neighborhood of the light source board in Embodiment 1 of the invention. FIG. 3 is a cross-sectional view in the E-E direction of FIG. 2. FIG. 4 illustrates the shape of a protruding portion of the light guide plate in Embodiment 1 of the invention.

Referring to FIGS. 1 through 4, a plurality of light sources 1 using point light sources such as LEDs are arranged at a predetermined spacing and connected to a light source board 2. The light source board 2 includes a power feeding portion 2a and is arranged in close proximity to the side surface 3a of the light guide plate 3. Light from the light sources 1 is incident from the side surface 3a of the light guide plate 3 and emitted from the light emitting surface 3b of the light guide plate 3 (the light emitting surface refers to the top surface of the light guide plate 3 as seen on a sheet of FIG. 1) On the light emitting surface 3b of the light guide plate 3, a diffusing sheet and an optical sheet 5 are provided. The diffusing sheet diffuses light from the light sources 1 to uniformly irradiate the display panel 4. The optical sheet 5, such as a lens sheet, changes the angle of the light from the light sources 1 to enhance the luminance on the display surface 4a of the display panel 4 in the front direction are provided. On a counter light emitting surface 3c of the light guide plate 3 (the counter light emitting surface opposite refers to the bottom surface of the light guide plate 3 as seen on a sheet of FIG. 1), a reflective sheet 6 is provided so as to efficiently reflect light from the light sources 1 onto the light emitting surface 3b of the light guide plate 3.

A middle frame 7 is arranged for supporting the light source board 2, light guide plate 3, optical sheet 5 and reflective sheet 6. An adhesive sheet 8 including an opening that also acts as a light shield is arranged on the optical sheet 5 so as to fix the light guide plate 3 and the optical sheet 5 to the middle frame 7. The light sources 1, light source board 2, light guide plate 3, display panel 4, optical sheet 5, reflective sheet 6, middle frame 7 and adhesive sheet 8 are sandwiched by a front frame including an opening and a rear frame (not shown). While the light sources 1 and light source board 2 are provided on one side surface of the light guide plate 3 alone in FIG. 1, the invention is not limited thereto but the light sources and a light source board may be provided on two or more side surfaces of the light guide plate. Except the LED, the light source 1 may be various types of light source such as a Laser Diode.

As shown in FIGS. 1 through 4, in this embodiment, the light guide plate 3 containing a polyethylene terephthalate (PET), acrylic (PMMA), polycarbonate (PC) or cycloolefin resin or a glass includes at least two protruding portions 3d for position regulation on the side surface 3a close to the light source board 2 which is other than the light emitting surface 3b and the counter light emitting surface 3c.

Further, the counter light emitting surface 3c of the light guide plate 3 has a light scattering portion (not shown) for scattering the propagating direction of light to guide the light to the light emitting surface 3b. The light scattering portion functions as means for extracting light from a light guide plate by disordering the total reflecting condition of light propagating inside the light guide plate. To be more specific, the means for scattering the light includes a method for printing a dot pattern on the counter light emitting surface 3c of the light guide plate 3, a method for making rough the counter light emitting surface 3c, and a method for forming asperities to change the propagating direction of light such as microscopic spheres or prisms on the counter light emitting surface 3c.

Providing asperities on the light emitting surface 3b instead of providing a light scattering portion on the counter light emitting surface 3c of the light guide plate 3 obtains the same effect. To be more precise, In case asperities are provided on the light emitting surface 3b of the light guide plate 3, light emitted from the light emitting surface 3b has its propagating direction scattered. As a result, some of the light rays emitted from the light emitting surface 3b are reflected toward the interior of the light guide plate 3 and the remaining light rays are emitted outward of the light guide plate 3 from the light emitting surface 3b. As long as asperities are provided on the light emitting surface 3b of the light guide plate 3 alone, a light diffusing portion need not be provided on the remaining surfaces.

The plurality of optical sheets 5 have at least two protruding portions 5b for position regulation formed on the side surface 5a facing the light source board 2 and are arranged facing the light emitting surface 3b of the light guide plate 3. With this configuration, there is no need to provide the protruding portions 3d of the light guide plate 3 and the protruding portions 5b of the optical sheet 5 except on the side surface facing the light source board 2, which narrows the frame area. Further, there is no need to form fitting portions fitted to the protruding portions 3d of the light guide plate 3 and the protruding portions 5b of the optical sheet 5 on the middle frame 7. This simplifies the structure of a display device.

The light source board 2 arranged in close proximity to the side surface 3a where the protruding portions 3d of the light guide plate 3 are formed has an almost linear shape. With this structure, the number of light source boards 2 generally segmented from a film increases thus reducing the production costs. The "almost linear shape" need not have perfect straight lines but may include some bent sections as long as the light source board 2 can be efficiently segmented.

The power feeding portion 2a of the light source board 2 is provided to project outside a display device from a side surface adjacent to the side surface 3a where the protruding portions 3d of the light guide plate 3 are formed. This ensures that the light source board 2 has a linear shape, which makes it possible to more efficiently segment the light source board 2.

A concave portion 3e is formed at a protruding portion 3d of the light guide plate 3, the light source board 2 is received by the concave portion 3e, and the concave portion 3e of the protruding portion 3d of the light guide plate 3 and the protruding portion 5b of the optical sheet 5 are used to sandwich the light source board 2. In this way, the top surface 5c of the protruding portion 5b of the optical sheet 5 stacked on the light source board 2 is flush with the top surface 5d of the optical sheet 5 stacked in contact with the light guide plate 3. This prevents an increase in the thickness of the entire display device. A supporting portion 3f having the same plane as the light emitting surface 3b of the light guide plate 3 is provided without making the entire protruding portion 3d of the light guide plate 3 into the concave portion 3e. This prevents the light source board 2 from dropping toward the reflective sheet 6 and properly keeps the position of the light sources 1.

The light source board 2 is fixed to the concave portion 3e formed at the protruding portion 3d of the light guide plate 3 with an adhesive material such as an adhesive sheet. This prevents the optical sheet 5 from being pushed up and deformed by way of the resilience of the light source board 2 thereby preventing degradation of display quality.

As shown in FIGS. 3 and 4, assuming that the height of the concave portion 3e of the light guide plate 3 is h, the height h of the concave portion 3e of the light guide plate 3 is preferably almost equal to or greater than the sum of the thickness of the light source board 2 and the thickness of the adhesive material so as not to influence the overall thickness of the entire display device. It is more preferable that the height h of the concave portion 3e of the light guide plate 3 is preferably almost equal to the sum value unless the optical sheet 5 is deformed and the display quality is degraded. Assuming that the height from the counter light emitting surface 3c of the light guide plate 3 is H, the height h of the concave portion 3e of the light guide plate 3 is preferably set to satisfy H-h≧0.4 mm thus facilitating the working of the concave portion 3e of the light guide plate 3.

Assuming that the width of the concave portion 3e of the light guide plate 3 is v, it is preferable that the width v of the concave portion 3e of the light guide plate 3 is almost equal to or greater than the width W of the light source board 2 so as to allow the light source board 2 to be reliably stacked with the concave portion 3e of the light guide plate 3.

Further, assuming that the width of the supporting portion 3f of the light guide plate 3 is x, it is preferable to define x as x≧1 mm so as to prevent damage to the supporting portion 3f of the light guide plate 3 caused when the light source board 2 is fixed to the concave portion 3e of the light guide plate 3 with an adhesive material.

The optical sheet 5 may include a lens sheet sandwiched by diffusing sheets. To enhance the luminance of the display panel 4, a combination of a plurality of lens sheets may be used considering the direction of prisms formed on the surface of the lens sheet. A combination of a plurality of diffusing sheets may be used to improve the diffusing property. The use of the optical sheet 5 is preferably optimized in view of the target luminance and light distribution characteristic.

The reflective sheet 6 includes a material of a mixture of polypropylene (PP) or polyethylene terephthalate (PET) and barium sulfate or titanium oxide, a material of a resin where microscopic air bubbles are formed, a material of a metal plate with silver evaporated thereon, or a material of a metal plate with a coating including titanium oxide.

The middle frame 7 may include a resin material including a mixture of PC (polycarbonate) or ABS (acrylonitrile butadiene styrene) and titanium oxide in Embodiment 1. In addition, if the middle frame 7 includes a metal material such as aluminum, stainless steel or iron, suppress costs and ensure strength are obtained.

Embodiment 2

Figure 5:
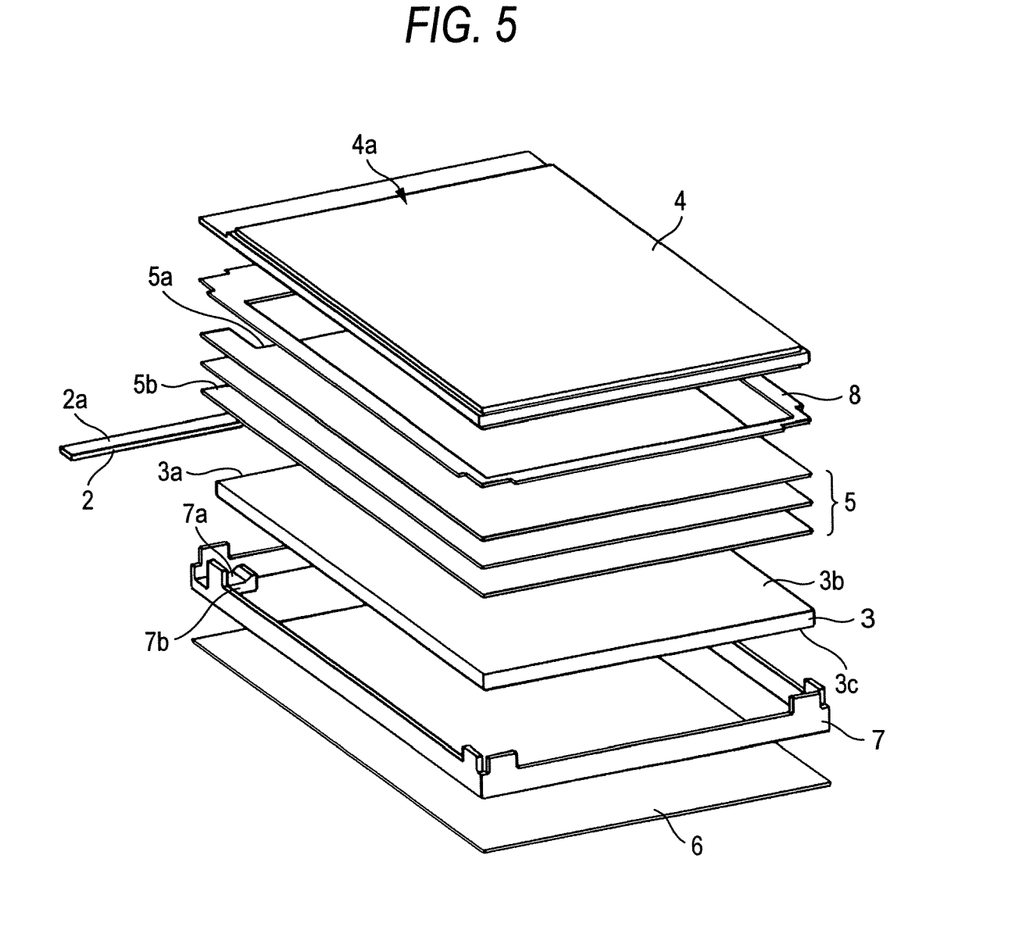
FIG. 5 is an exploded perspective view of a display device in Embodiment 2 of the invention.
Figure 6:
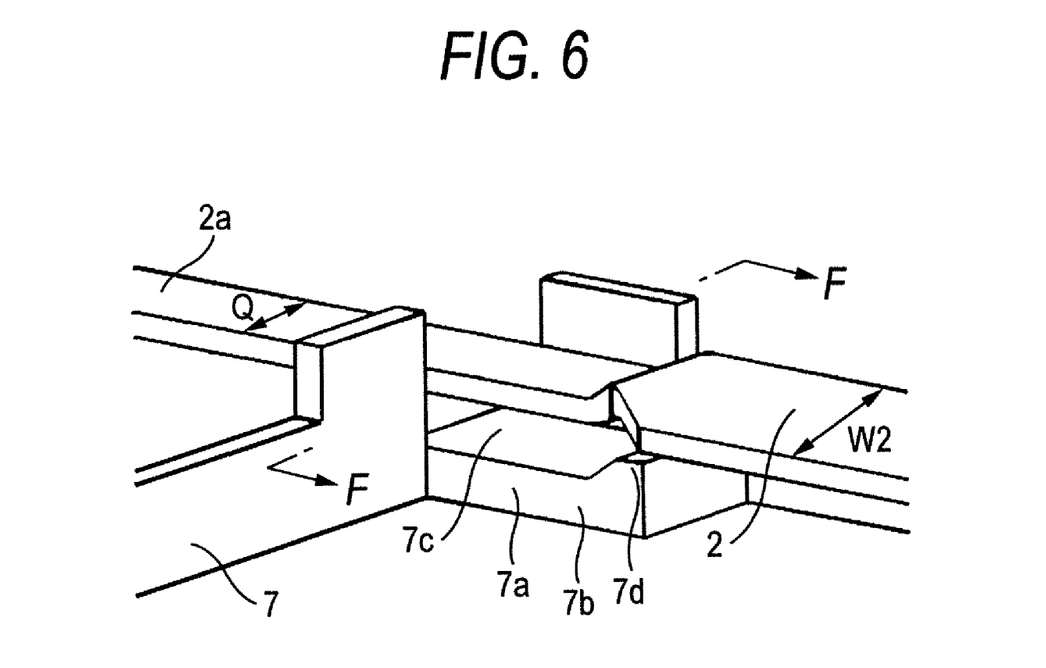
FIG. 6 is an enlarged view of a power feeding portion and its neighborhood of the light source board in Embodiment 2 of the invention.
Figure 7:
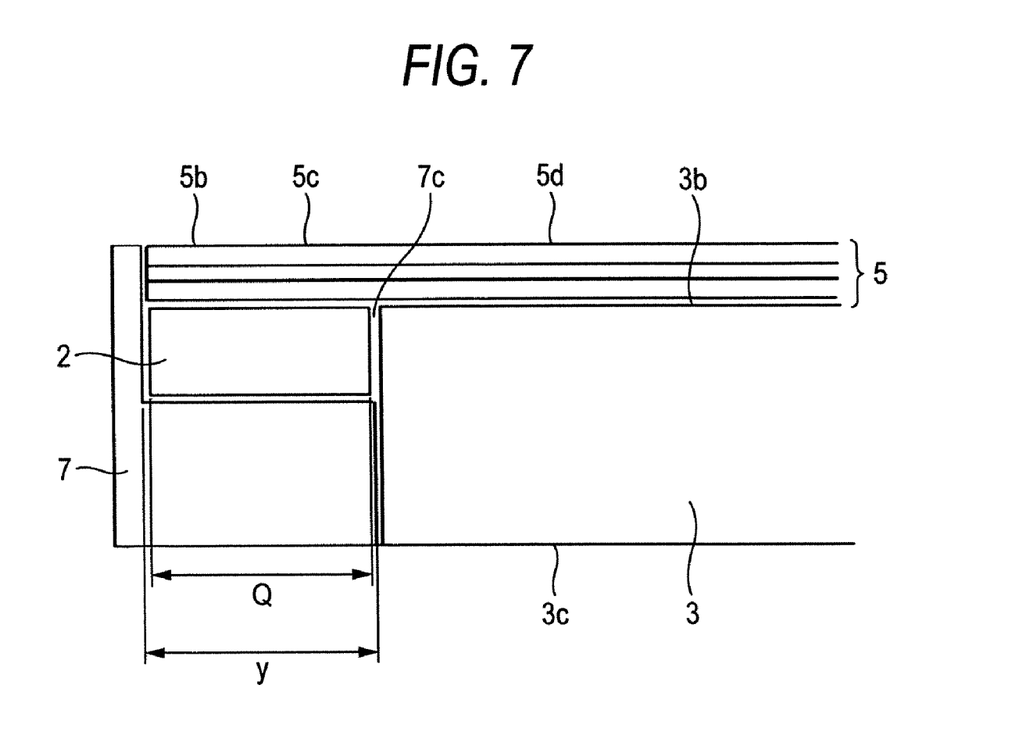
FIG. 7 is a cross-sectional view in the F-F direction of the display device in FIG. 6 with an optical sheet stacked thereon.
Figure 8:
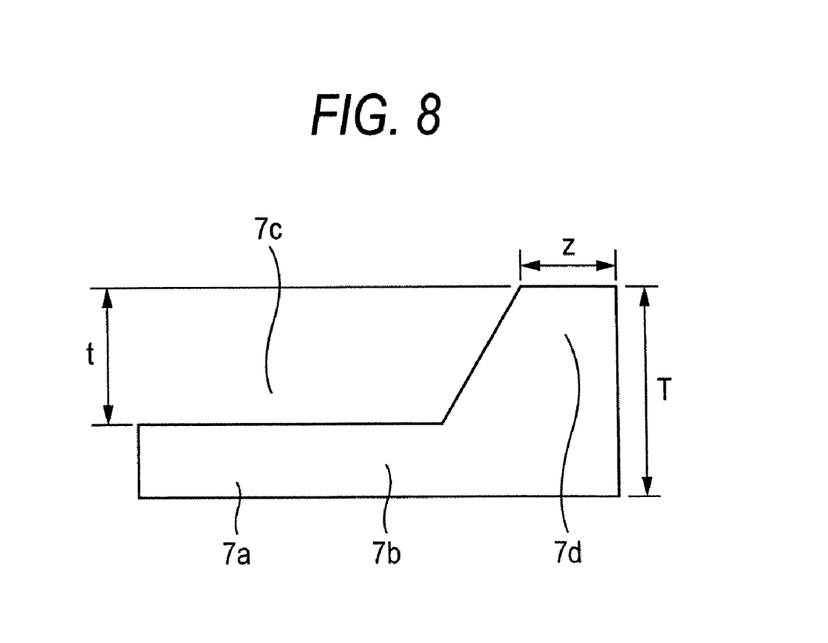
FIG. 8 illustrates the shape of a protruding portion of the middle frame in Embodiment 2 of the invention.

Embodiment 2 of the invention will be described referring to FIGS. 5 through 8. FIG. 5 is an exploded perspective view of a display device in Embodiment 2 of the invention. FIG. 6 is an enlarged view of a power feeding portion and its neighborhood of the light source board in Embodiment 2 of the invention. FIG. 7 is a cross-sectional view in the F-F direction of the display device in FIG. 6 with an optical sheet stacked thereon. FIG. 8 illustrates the shape of a protruding portion of the middle frame in Embodiment 2 of the invention. In FIGS. 5 through 8, a same component as that in FIGS. 1 through 4 is given the same sign.

As shown in FIGS. 5 through 8, in Embodiment 2, the plurality of optical sheets 5 have at least two protruding portions 5b for position regulation formed on the side surface 5a facing the light source board 2 and are arranged facing the light emitting surface 3b of the light guide plate 3. On the light guide plate 3, there are no protruding portions formed for position regulation on a side surface 3a that is other than the light emitting surface 3b and the counter light emitting surface 3c. The inner side surface 7b of the middle frame 7 having at least two protruding portion s 7a formed thereon is used to regulate the position of the light guide plate 3 in horizontal direction.

With this configuration, there is no need to provide the protruding portions 5b of the optical sheet 5 except on the side surface 5a facing the light source board 2. Further, there is no need to provide protruding portions for position regulation of the light guide plate 3 on all four side surfaces, which narrows the frame area. Moreover, there is no need to form fit portions fitted to the protruding portions of the light guide plate 3 and the protruding portions 5b of the optical sheet 5 on the middle frame 7. This simplifies the structure of a display device.

The light source board 2 arranged in close proximity to the side surface 3a of the light guide plate 3 has an almost linear shape. With this structure, the number of light source boards 2 segmented increases thus reducing the production costs. The "almost linear shape" need not have perfect straight lines but may include some bent sections as long as the light source board 2 can be efficiently segmented.

The power feeding portion 2a of the light source board 2 is provided to project outside a display device from the side surface 5a of the optical sheet 54 toward a side surface adjacent to the side surface 5a where the protruding portions 5b of the optical sheet 5 are formed. This ensures that the light source board 2 has a linear shape, which makes it possible to more efficiently segment the light source board 2.

A concave portion 7c is formed at a protruding portion 7a of the middle frame 7 and the light source board 2 is stored and is sandwiched by the concave portion 7c at the protruding portion 7a of the middle frame 7 and the protruding portion 5b of the optical sheet 5. In this way, the top surface 5c of the protruding portion 5b of the optical sheet 5 stacked on the light source board 2 is flush with the top surface 5d of the optical sheet 5 stacked in contact with the light guide plate 3. This prevents an increase in the thickness of the entire display device. A supporting portion 7d having the same plane as the light emitting surface 3b of the light guide plate 3 is provided without making the entire protruding portion 7a of the middle frame 7 into the concave portion 7c. This prevents the light source board 2 from dropping toward the reflective sheet 6 and properly keeps the position of the light sources 1.

The light source board 2 is fixed to the concave portion 7c formed at the protruding portion 7a of the middle frame 7 with an adhesive material such as an adhesive sheet. This prevents the optical sheet 5 from being pushed up and deformed by way of the resilience of the light source board 2 thereby preventing degradation of display quality.

As shown in FIGS. 7 and 8, assuming that the height of the concave portion 7c of the middle frame 7 is t, the height t of the concave portion 7c of the middle frame 7 is preferably almost equal to or greater than the sum of the thickness of the light source board 2 and the thickness of the adhesive material so as not to influence the overall thickness of the entire display device. It is more preferable that the height t of the concave portion 7c of the middle frame 7 is preferably almost equal to the sum value unless the optical sheet 5 is deformed and the display quality is degraded. Assuming that the height of the supporting portion 7d provided at the protruding portion 7a of the middle frame 7 is T, the height t of concave portion 7c of the middle frame 7 is preferably set to satisfy T-t≧0.4 mm thus facilitating the working of the concave portion 7c of the middle frame 7.

The light source board 2 has a first portion and second portion respectively having different widths. The first portion includes the power feeding portion 2a and a part of the light source board 2 located on the concave portion 7c. The second portion includes the portion except the first portion. Assuming the width of first portion is Q and the width of the second portion is W2, Q is defined as Q<W2. An end of the second portion connected to the first portion may have a tapered portion as shown in FIG. 6. Assuming that the width of concave portion 7c of the middle frame 7 is y, by keeping y<W2, the light source board 2 can be partially supported by the light emitting surface 3b of the light guide plate 3. It is thus possible to provide the side surface of the light guide plate 3 supported by the side surface 7b of the protruding portion 7a of the middle frame 7 in a planer shape without asperities. This simplifies the shape of the light guide plate 3, facilitates the working, and suppresses uneven luminance that occurs in the presence of asperities. Assuming that the width of the light source board 2 not supported by the light emitting surface 3b of the light guide plate 3 (first portion) is Q, it is preferable to define Q as Q≦y so that the light source board 2 may be reliably stacked on the concave portion 7c of the middle frame 7.

Further, assuming that the width of the supporting portion 7d of the middle frame 7 is z, it is preferable to define z as z≧1 mm so as to prevent damage to the supporting portion 7d of the middle frame 7 caused when the light source board 2 is fixed to the concave portion 7c of the middle frame 7 with an adhesive material.

In Embodiment 2, the middle frame 7 functions as a reflector to reflect some of the light rays emitted from the light sources 1 toward the side surface 3a of the light guide plate 3. Thus the middle frame 7 is preferably white from the viewpoint of light reflection efficiency. The middle frame 7 may include a metal material such as aluminum, stainless steel or iron. Also, the middle frame 7 may include a resin material including a mixture of PC (polycarbonate) or ABS (acrylonitrile butadiene styrene) and titanium oxide in Embodiment 2 thus obtaining a low-cost, lightweight middle frame 7. This approach suppresses electrical conductivity between the light source board 2 and the middle frame 7.

In Embodiment 2, while the protruding portion 7a of the middle frame 7 is formed at each end of the middle frame 7 facing the light source board 2, it is possible to arbitrarily determine the positions, number or shape of the protruding portions considering the overall structure so as to allow position regulation of the light guide plate 3.

While a plate is used as a light guide plate 3 in Embodiments 1 and 2, the invention is not limited thereto. For example, a wedge-shaped light guide plate 3 whose thickness decreases with distance from the light source 1 allows incident light to be efficiently propagated and the light to be efficiently guided to the light emitting surface 3b.

In Embodiments 1 and 2, by using a thin FPC (Flexible Printing Circuit) as a light source board 2, the external size of the display device is reduced.

According to the embodiments of the invention, it is possible to obtain a display device capable of reliably regulating the displacement of an optical sheet and a light guide plate without degrading the display quality as well as decreasing the manufacturing costs and reducing the frame size.

What is claimed is:

1. A display device comprising:
   a light source;
   a light guide plate including a first plate surface that emits light incident from the light source, a second plate surface perpendicular to the first plate surface, and at least two protruding portions at a side of the second plate surface;
   a light source circuit board including the light source arranged thereon, the light source including a plurality of lighting elements, the light source circuit board being on the at least two protruding portions of the light guide plate, the light source disposed between the at least two protruding portions of the light guide plate and the light source configured to emit light towards the second plate surface of the light guide plate; and
   an optical sheet including a first sheet surface arranged to face the first plate surface, a second sheet surface arranged to face the light source circuit board, and at least two protruding portions which correspond in position to the protruding portions of the light guide plate,
   wherein at least one of the protruding portions of the light guide plate includes a concave portion, and at least part of the light source circuit board is disposed between the concave portion and the protruding portion of the optical sheet such that the light source circuit board is housed between the concave portion and at least one of the protruding portion of the optical sheet.

2. The display device according to claim 1, wherein the light source circuit board has an almost linear shape.

3. The display device according to claim 2, wherein the light guide plate includes a third plate surface adjacent to the second plate surface, and the light source circuit board includes a power feeding portion provided at a side facing the third plate surface, the power feeding portion being parallel to a portion of the light source circuit board having the plurality of lighting elements and being at a different elevation than an elevation of the portion of the light source circuit board having the plurality of lighting elements such that one of the protruding portions of the at least two protruding portions of the optical sheet are on the power feeding portion.

4. The display device according to claim 1, wherein the protruding portions of the light guide plate and the protruding portions of the optical sheet are formed at ends of the second plate surface and the second sheet surface, respectively.

5. The display device according to claim 4, wherein each of the protruding portions of the light guide plate includes a concave portion, the concave portion receives the light source circuit board, and the light source circuit board is sandwiched by the concave portion formed at the protruding portion of the light guide plate and the protruding portion of the optical sheet.

6. The display device according to claim 5, wherein the light source circuit board is bonded to the concave portions formed at the protruding portions of the light guide plate.

7. A display device comprising:
   a light source;
   a light guide plate including a first plate surface that emits light incident from the light source, and a second plate surface perpendicular to the first plate surface;
   a light source circuit board including the light source arranged thereon, the light source circuit board arranged to emit light towards the second plate surface;
   an optical sheet including a first sheet surface arranged to face the first plate surface, a second sheet surface arranged to face the light source circuit board, and at least two protruding portions at a side of the second sheet surface, the light source disposed between the at least two protruding portions; and
   a middle frame including at least two convex portions on an inner side surface thereof to support the light guide plate with side surfaces of the at least two convex portions; wherein the protruding portions of the optical sheet are formed at ends of the second sheet surface; wherein each of the convex portions of the middle frame includes a concave portion, the concave portions receive the light source circuit board, and the light source circuit board is sandwiched by the concave portion formed at the convex portions of the middle frame and the protruding portions of the optical sheet.

8. The display device according to claim 7, wherein the light source circuit board has an almost linear shape.

9. The display device according to claim 8, wherein the optical sheet includes a third sheet surface adjacent to the second sheet surface, and the light source circuit board includes a power feeding portion provided at a side facing the third sheet surface.

10. The display device according to claim 7, wherein the light source circuit board is bonded to the concave portions formed at the convex portions of the middle frame.

11. The display device according to claim 7, wherein:

the light source includes at least three lighting elements.

12. The display device according to claim 7, wherein:

the light source is disposed between the at least two protruding portions without contacting any other protrusion.

* * * * *